United States Patent [19]

Arai

[11] Patent Number: 5,028,992
[45] Date of Patent: Jul. 2, 1991

[54] IMAGE COMBINING APPARATUS FOR A DIGITAL COLOR COPIER

[75] Inventor: Hiroshi Arai, Yokohama, Japan

[73] Assignee: Ricoh Company, Ltd., Tokyo, Japan

[21] Appl. No.: 389,407

[22] Filed: Aug. 4, 1989

[30] Foreign Application Priority Data

Aug. 25, 1988 [JP] Japan ................................. 62-209543
Aug. 25, 1988 [JP] Japan ................................. 63-209545
May 2, 1989 [JP] Japan ................................. 1-112201

[51] Int. Cl.$^5$ ............................................. H04N 1/46
[52] U.S. Cl. ........................................ 358/75; 358/78; 358/300
[58] Field of Search ................... 358/75, 75 IJ, 78, 79, 358/80, 296, 300; 346/76 PH, 138

[56] References Cited

U.S. PATENT DOCUMENTS 4,660,072 4/1987 Kawamura et al. ................ 358/75
4,814,790 3/1989 Nitta ................................. 346/76 PH
4,831,409 5/1989 Tatara et al. ..................... 358/300
4,908,712 3/1990 Uchiyama et al. ................. 358/80

Primary Examiner—James J. Groody
Assistant Examiner—Kim Yen Vu
Attorney, Agent, or Firm—Oblon, Spivak, McClelland, Maier & Neustadt

[57] ABSTRACT

An image combining apparatus for a digital color copier having a plurality of photoconductive drums each being assigned to respective one of yellow, magenta, cyan and black, and a delay memory for delaying data stored and associated with the individual colors to thereby register images of the individual colors. The delay memory plays the role of a frame memory. The apparatus is capable of combining an image of a black-white image stored in the frame memory in the form of black data and a color image of a color document, and combining a color image of a color document stored in the delay memory in the form of color data and a black-white image of a black-white document. These two different combinations are switched over to be effected one at a time, as desired.

5 Claims, 11 Drawing Sheets

IMAGE COMBINING APPARATUS FOR A DIGITAL COLOR COPIER

BACKGROUND OF THE INVENTION

The present invention relates to an image combining apparatus for a digital copier of the type having a delay memory and four photoconductive drums.

A digital color copier having four photoconductive drums each being operable with respective one of a yellow developer Y, a magenta developer M, a cyan developer C and a black developer Bk is drawing much attention in the imaging art. In this type of copier, a buffer memory may be installed to serve as a delay memory, as disclosed in Japanese Laid-Open Utility Publication (Kokai) No. 61-196268. The drums each being assigned to a different color as mentioned above are arranged at predetermined intervals. It has been customary to use the delay memory solely to delay the output of data associated with the individual colors in association with the distances of the drums. This, coupled with the fact that a memory for storing data of a color associated with the drum which is closest to a paper feed side of the copier has not been provided, leaves some problems left unsolved.

SUMMARY OF THE INVENTION

It is therefore an object of the present invention to provide an image combining apparatus for a digial color copier which is capable of combining a color image and a black-white image efficiently.

It is another object of the present invention to provide a generally improved image combining apparatus for a digital color copier.

In accordance with the present invention, an image combining apparatus for a digital copier having a plurality of photoconductive drums each developing an image in respective one of three colors and one particular color comprises a memory having a function of a delay memory usable to register images of the individual colors and a function of a frame memory, a data selector for selecting either one of data associated with the colors and data associated with the particular color for storing the selected data in the memory, combining means for combining, when the data selector has selected the color data, color image represented by the color data stored in the memory and an image of a particular color of a document of the particular color, and combining means for combining, when the data selector has selected the particular color data, an image of a particular color represented by the particular color data stored in the memory and a color image of a document of the colors.

Also, in accordance with the present invention, an image combining apparatus for a digital copier having a plurality of photoconductive drums each developing an image in respective one of three colors and one particular color comprises a memory having a function of a delay memory usable to register images of the individual colors and a function of a frame memory, the frame memory being assigned to data associated with the particular color while the delay memory being assigned to data associated with the colors and being used to register color images represented by the color data, and combining means for combining a particular color image represented by the data associated with the particular color stored in the frame memory and a color image of a document of the colors.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
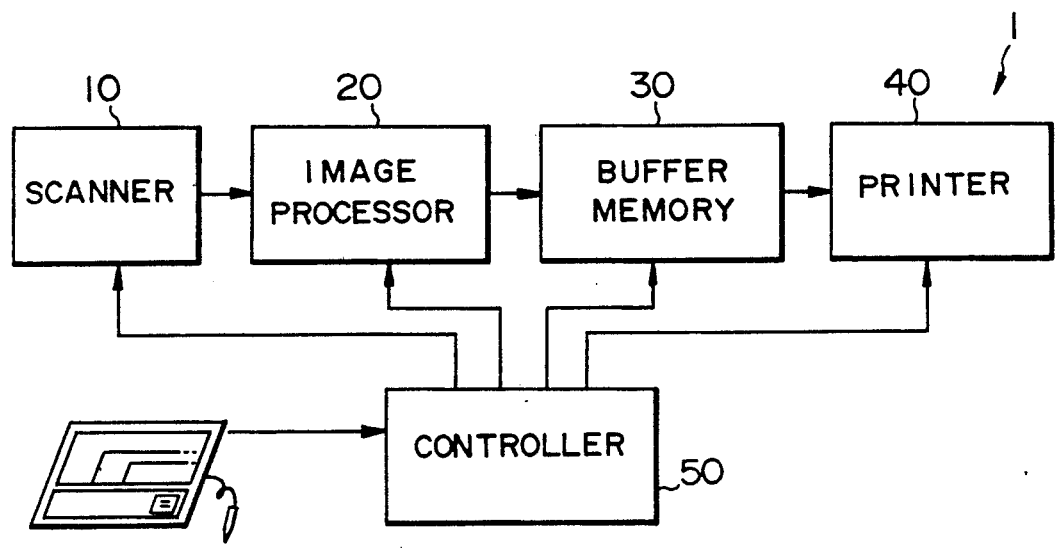
FIG. 1 is a schematic block diagram showing an embodiment of the image combining apparatus in accordance with the present invention.

Referring to FIG. 1 of the drawings, an image combining apparatus for a digital color copier embodying the present invention is shown and generally designated by the reference numeral 1. As shown, the apparatus 1 is generally made up of a scanner 10, an image processor 20, a buffer memory or delay memory 30, a printer 40, and a controller 50. The scanner 10 reads colors of red (R), green (G) and blue (B) of a document image by single scanning to thereby produce data associated with the three different colors. The image processor 20 applies color correction, tone correction and other similar image processing to the color data to output color data which are individually representative of yellow (Y), magenta (M), cyan (C), and black (Bk). These color data Y, M, C and Bk are delivered to the printer 40 at the same time. Since the printer 40 has four photoconductive elements in the form of drums each being assigned to respective one of yellow, magenta, cyan and black, it is necessary that the images individually associated with the different colors be registered with each other in the event of development. The register is implemented by the buffer memory, or delay memory, 30. Specifically, the register is effected by delaying the output of individual color data on the basis of the distances of the individual drums.

Figure 2:
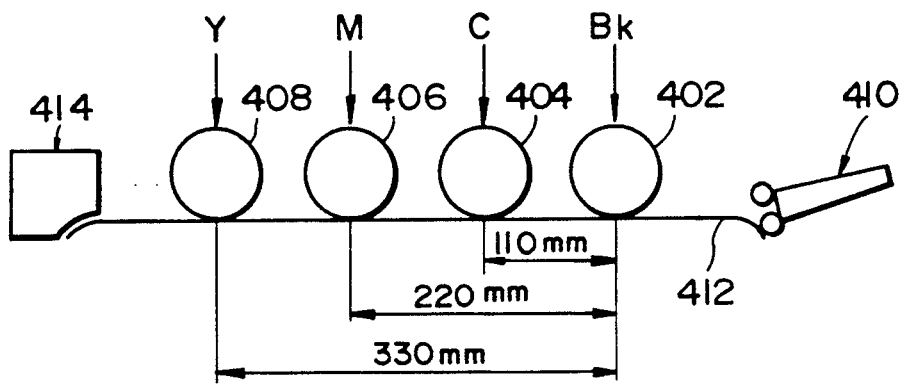
FIG. 2 schematically shows four photoconductive drums built in a 4-drum type printer and the neighborhood thereof.
Figure 3:
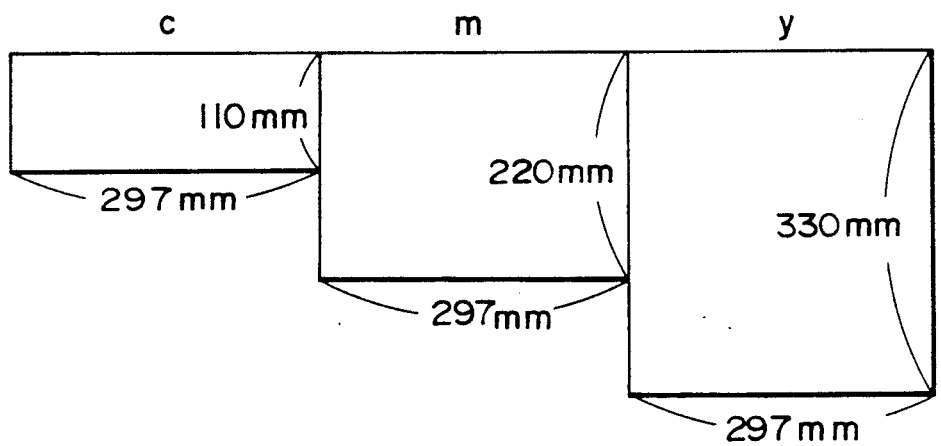
FIG. 3 shows a specific allocation of a delay memory.

FIG. 2 schematically shows a specific construction of the printer 40 having four drums as mentioned above. Namely, the printer 40 has drums 402, 404, 406 and 408, a paper feeder 410, a transport belt 412, and a fixing unit 414. Black data Bk, cyan data C, magenta data M and yellow data Y are fed to the drums 402, 404, 406 and 408, respectively. Assume that the distances from the drum or Bk drum 402 to the drums or C, M and Y drums 404, 406 and 408 are 110 millimeters, 220 millimeters and 330 millimeters, respectively. Then, as shown in FIG. 3, the delay memory 30 has a total capacity of 297 (millimeters, widthwise dimension of format A3)×[110 (millimeters)+220 (millimeters)+330 (millimeters)]=297 (millimeters)×660 (millimeters). The illustrative embodiment, therefore, uses the delay memory 30 as a frame memory. This will implement various kinds of copy modes such as an image repeat copy mode wherein the same pattern is repetitively reproduced on a single paper sheet, and a combine copy mode wherein data stored in the frame memory are combined with a document.

Figure 4:
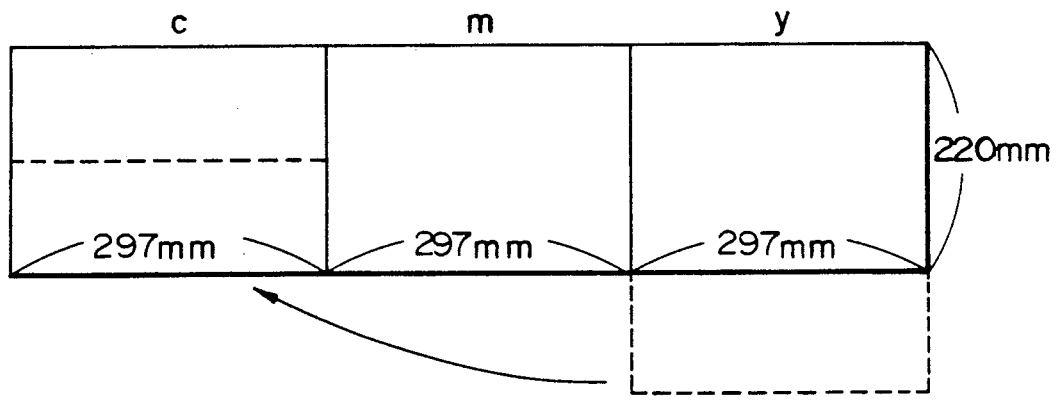
FIGS. 4 and 5 each shows a specific allocation of a frame memory.
Figure 5:
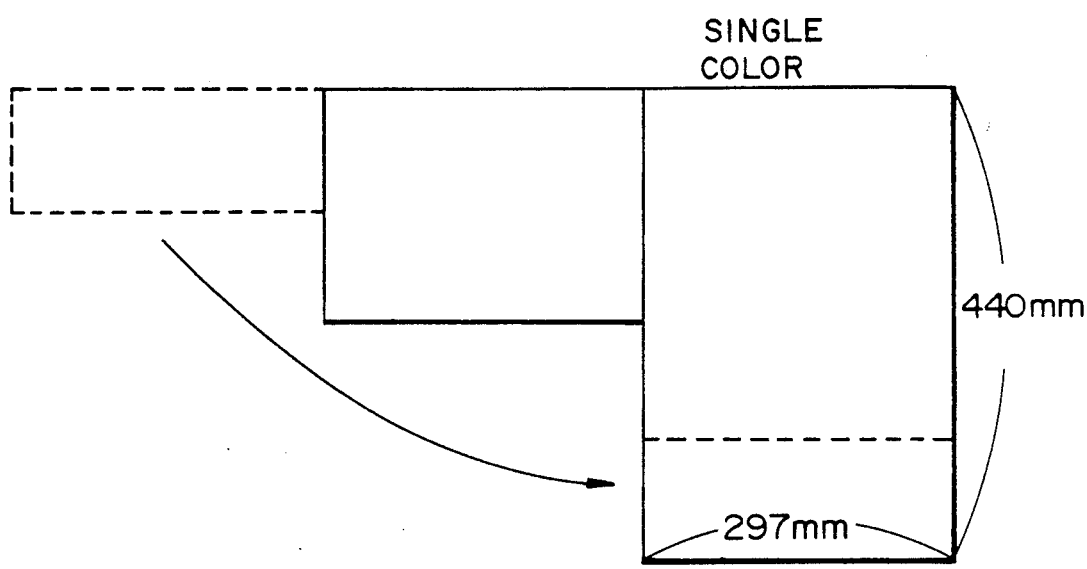

Concerning the combine copy mode, the delay memory 30 may be allocated as 297 (millimeters)×220 (millimeters)×3 to constitute an A4 frame memory accommodating cyan, magenta and yellow, as shown in FIG. FIG. 4. Then, it is possible to combine a color image stored in the memory and a black-white image of a black-white document. On the other hand, when the delay memory 30 is allocated as 297 (millimeters)×420 (millimeters)×1 as shown in FIG. 5, it turns out to be an A3 frame memory accomodating one of cyan, magenta, yellow, and black. This allows a black-white image of a black-white document and a color image of a single-color or monochromatic document of format A3 to be combined together. In this case, color data of a color image stored in the memory 30 and the black data of of a black-white image of a black-white document from the scanner 10 are synchronized to each other on the basis of the read start timing of the scanner 10. With such a scheme, it is also possible to store black data associated with a black-white document in the frame memory 30 and combine the black-white image with a color image of a color document.

In the light of the above, the illustrative embodiment is constructed and arranged to implement both of the combination of a black-white image stored in the memory in the form of black data and a color image of a color document, and the combination of a color image stored in the memory in the form of three-color color data and a black-white image of a black-white document. These two different kinds of combinations are effected one at a time.

Figure 6:
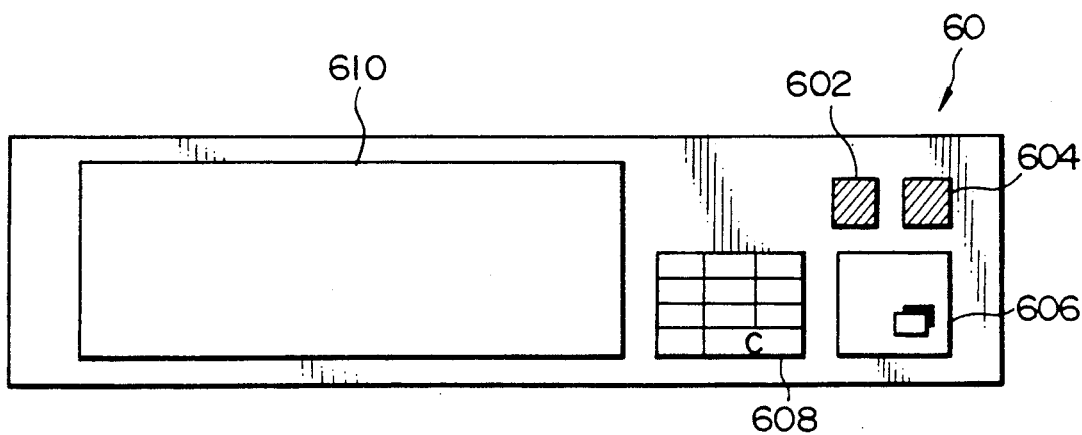
FIG. 6 is a plan view of an operation board.

FIG. 6 shows a specific arrangement of an operation board 60. As shown, the operation board 60 has thereon a combine mode ON/OFF key 602, a black-white/color key 604, a print key 606, numeral keys 608, and a display 610. When the combine mode ON/OFF key 602 is pressed to turn it OFF, an ordinary copy mode is set up.

[1] Ordinary Copy Mode

Figure 7:
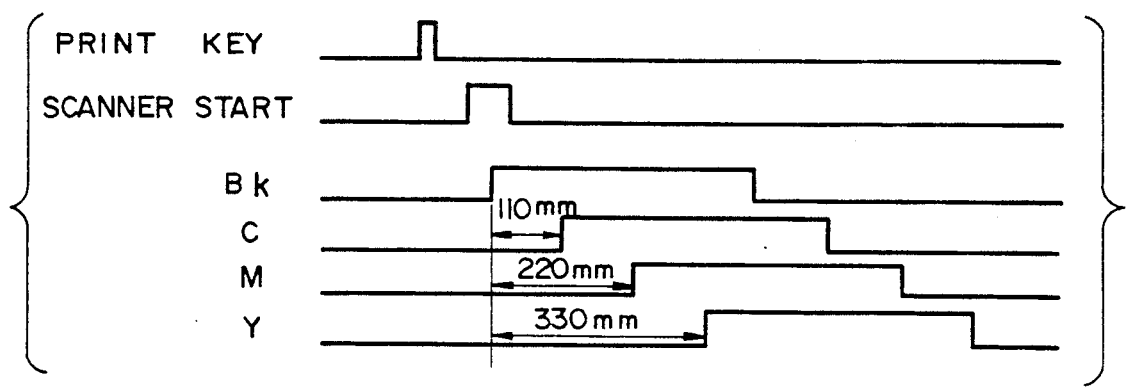
FIG. 7 is a timing chart demonstrating an operating sequence associated with the memory allocation of FIG. 3.

A memory allocation shown in FIG. 3 is set up which has a cyan memory c, a magenta memory m, and a yellow memory y which are dimensioned 110 millimeters, 220 millimeters, and 330 millimeters, respectively. When the print key 606 is pressed, the scanner 10 begins to scan a document. The resulting data are processed by the image processor 20 and then fed to the memory 30. After black data Bk have been outputted, cyan data C, magenta data M and yellow data Y are sequentially outputted in this order with delays corresponding to 110 millimeters, 220 millimeters, and 330 millimeters, respectively (because the addresses of the memories in the ordinary copy mode are provided by the outputs of 110 millimeters, 220 millimeters, and 330 millimeters counters). These timings are demonstrated in FIG. 7.

Figure 8:
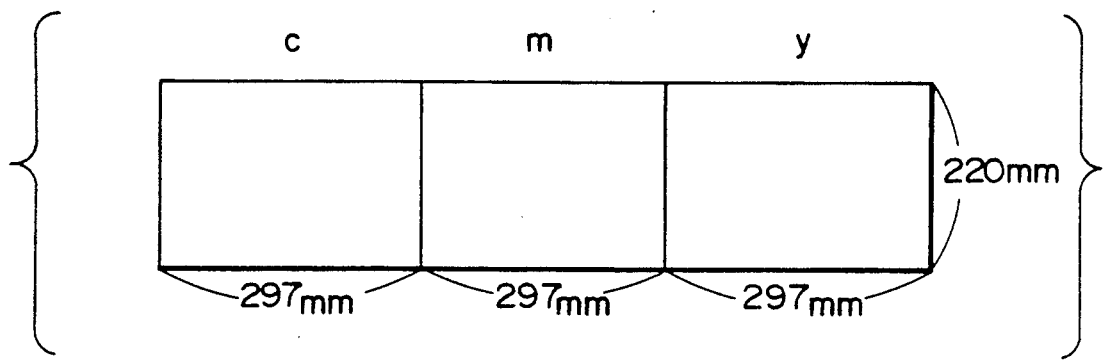
FIG. 8 shows a memory allocation available for combining a color image represented by data of three colors stored in the memory and a black-white image of a black-white document.

When the combine mode ON/OFF key is pressed to turn it ON, a combine copy mode is set up. Subsequently, when the black-white/color key 604 is pressed to select "color", a memory allocation shown in FIG. 8 is selected which has a cyan memory c, a magenta memory m, and a yellow memory 220 all of which are sized 220 millimeters.

[2] Combine Copy Mode I

Figure 9:
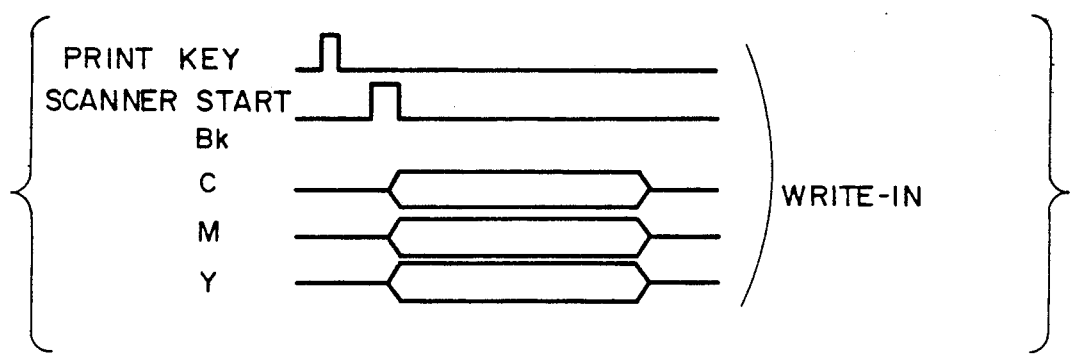
FIG. 9 is a timing chart demonstrating a write-in operation associated with the memory allocation of FIG. 8.
Figure 10:
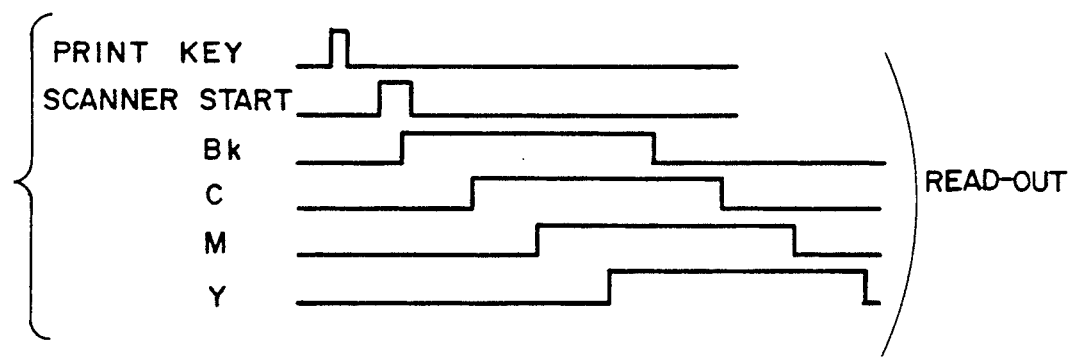
FIG. 10 is a timing chart indicating a read-out sequence also associated with the memory allocation of FIG. 8.

This combine mode available for combining a color image stored in the memory and a black-white image of a black-white document. When the print key 606 is pressed, the scanner 10 begins to scan a document at the same timing as in the ordinary copy mode. The resulting color data associated with the respective colors, i.e., cyan data C, magenta data M and yellow data Y are stored in the frame memory 30 which is sized 220 millimeters. Then, as a black-white document is set and the print key 606 is pressed, black data Bk of the document begin to be outputted. Subsequently, the cyan data C, magenta data M and yellow data Y are outputted in this sequence with delays corresponding to 110 millimeters, 220 millimeters, and 330 millimeters, respectively. The delays of the color data C, M and Y are adjusted on the basis of memory addressing. The procedure described above will be better understood with reference to FIGS. 9 and 10.

Figure 11:
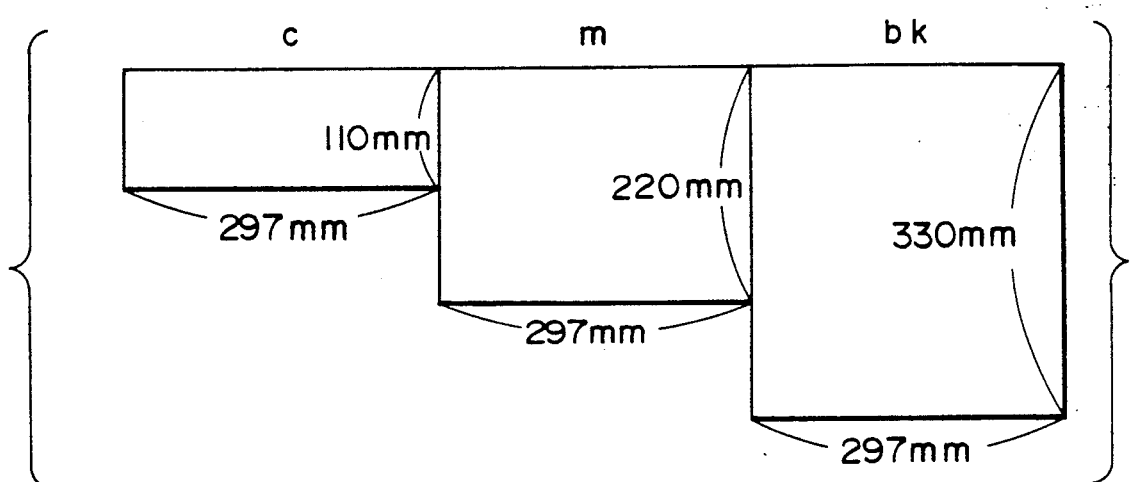
FIG. 11 shows a memory allocation available for combining a black-white image represented by black data stored in the memory and a color image of a color document.

When the black-white/color key 604 is pressed to select "black-white", a memory allocation shown in FIG. 11 is set up which has a black memory bk which is the frame memory sized 330 millimeters, and a magenta memory m sized 110 millimeters, and a yellow memory y sized 220 millimeters which are the delay memories.

[3] Combine Copy Mode II

Figure 12:
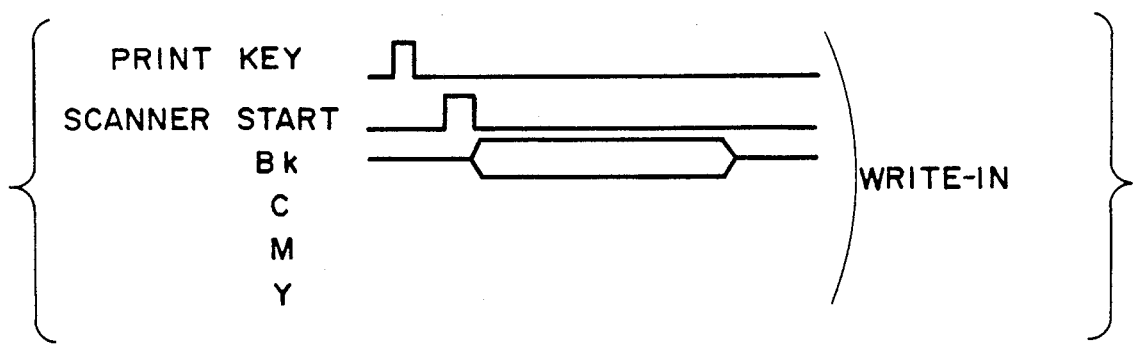
FIG. 12 is a timing chart showing a write-in sequence associated with the memory allocation of FIG. 11.
Figure 13:
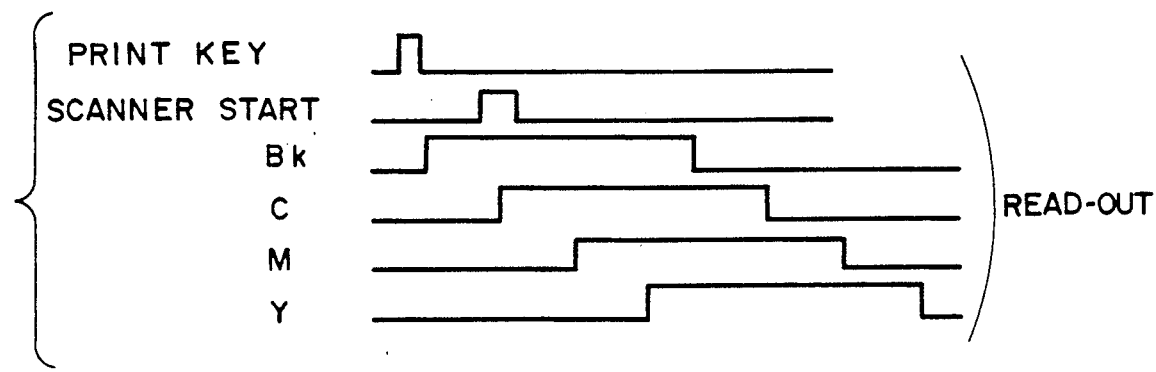
FIG. 13 is a timing chart showing a read-out sequence implemented by the memory allocation of FIG. 11.

This mode may be effected to combine a black-white image stored in the memory and a color image of a color document. When the print key 606 is pressed, the scanner 10 starts scanning a document at the same timing as in the ordinary copy mode. Black data Bk associated with the document are written in the 330 millimeters frame memory 30. After a color document has been set, the print key 606 is pressed again resulting in the black data Bk being fed from the frame memory 30. The scanner 10 starts scanning the color document so that cyan data C are fed to the printer 40 in synchronism with the black data Bk read out of the memory. Thereafter, magenta data M and yellow data Y are outputted in this order with delays corresponding to 110 millimeters and 220 millimeters, respectively (outputs of the 110 millimeters and 220 millimeters counters are used). These timings are shown in FIGS. 12 and 13.

Figure 14:
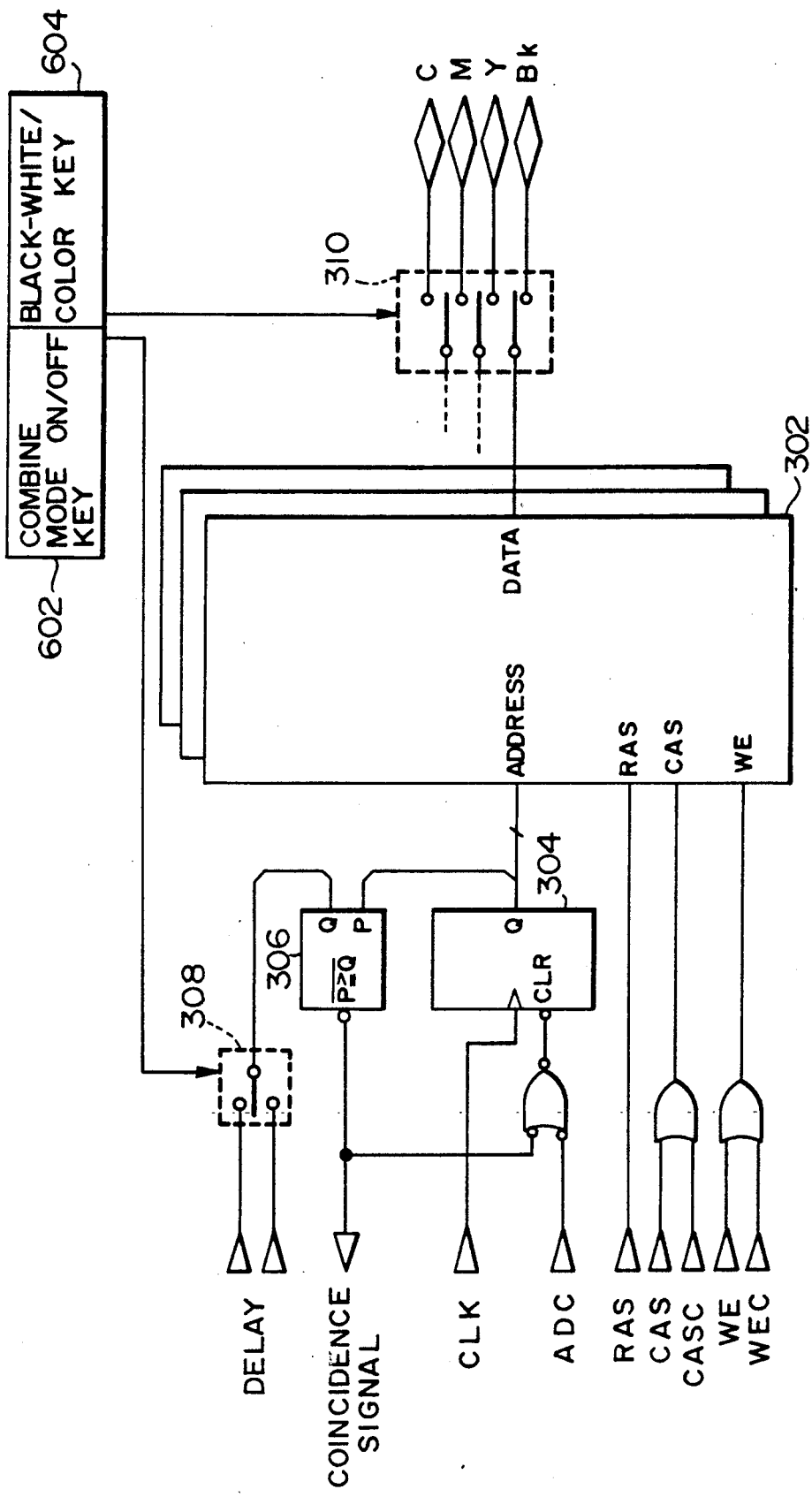
FIG. 14 is a schematic block diagram showing a specific construction of the embodiment.
Figure 15:
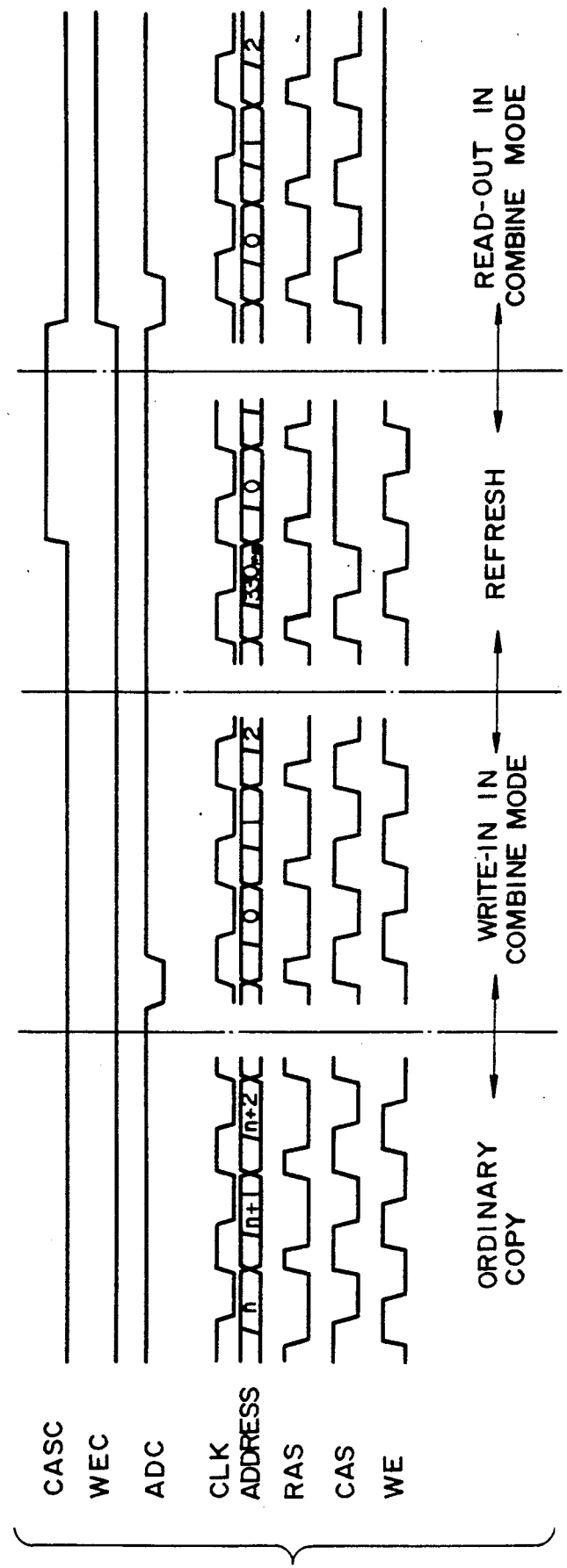
FIG. 15 is a timing chart demonstrating the operation of the circuitry shown in FIG. 14.

Referring to FIG. 14, a more specific construction of the illustrative embodiment is shown. In the figure, there are shown a memory 302, a counter 304, a comparator 306, a switch 308, and a data selector 310 in the form of a switch. It is to be noted that the memory 302 and its associated circuitry shown in FIG. 14 are assigned to a single color, i.e., such a memory and associated circuitry are assigned to each of the three different colors. Signals CLK, RAS, CAS and WEC control the memory 302 and are generated by hardware. An address control signal ADC, a CAS control signal CASC and a WE control signal are generated by a CPU (Central Processing Unit) on a software basis in response to a coincidence signal which the comparator 304 produces. The operation will be described with reference to the timing chart of FIG. 15.

[1] Ordinary Copy Mode

In the ordinary copy mode, the memory, of course, plays the role of a delay memory. All of the address control signal ADC, CAS control signal CASC and WE control signal WEC are in a low level and fed to the memory 302 together with the control signals RAS, CAS and WE. The counter 304 is so set as to be cleared only when the output of the memory 302 coincides with 110 millimeters, 220 millimeters and 330 millimeters, the outputs of the counter 304 being representative of the addresses of the memories 302. Assume that the memory 302 is implemented as a DRAM, and use is made of a read-write cycle. Since the output of the combine mode ON/OFF switch key 602 is OFF, the data selector 310 is connected to cyan data C, magenta data M, and yellow data Y.

[2] Combine Copy Mode

While the previously described copy modes I and II are available when the output of the combine mode ON/OFF key 602 is ON, they will be described without distinction because the timings associated with the DRAM are the same.

(1) Write-IN in Combine Copy Mode

The memory is reset by the address control signal ADC before the start of write-in in order to match the write start addresses. Simultaneously, when "black-white" is selected for the frame memory by the black-white/color key 604, magenta data M, yellow data Y and black data Bk are coupled to the individual memories 302. On the other hand, when "color" is selected, cyan data C, magenta data M and yellow data Y are coupled to the individual memories 302. The black data Bk are written in address 0 and successive addresses when "black-white" is selected as the frame memory, while the cyan data C, magenta data M and yellow data Y are written in address 0 and successive addresses at the same time when "color" is selected.

(2) Refresh in Combine Copy Mode

When the output of the comparator 306 shown in FIG. 14 becomes active, i.e., when the comparator 306 produces a coincidence signal, the CAS control signal CASC is caused into a high level to set up a RAS only refresh cycle. In this condition, 330 millimeters of data will be held when "black-white" is selected, and 220 millimeters of data will be held when "color" is selected.

(3) Read-Out in Combine Mode

The description will begin with a case wherein "black-white" is selected for the frame memory. When the print key 606 is pressed, the address control signal ADC is brought into a low level to set the read address to 0. Simultaneously, the CAS control signal and the WE control signal WEC become low and high, respectively, setting up a memory read cycle. On the other hand, when "color" is selected, address control does not become 0 immediately on the operation of the print key 606, i.e., it turns to 0 with a delay of 100 millimeters for the cyan memory c, a delay of 220 millimeters for the magenta memory m, and a delay of 330 millimeters for the yellow memory y. Until then, a refresh cycle is executed. After the read address has been set to 0, the CAS control and WE control are effected in the same manner as when "black-white" is selected.

The illustrative embodiment shown and described has the following advantages:

(1) When a black-white image of a black-white document and a color image of a color document are to be combined, one of them which is used more frequently than the other may be stored in the frame memory, promoting the ease of operation; and (2) When the color data are not two-level data but multilevel data and if data to be treated as black data are two-level data such as characters, the frame memory may serve as a frame memory greater than format A3 and, hence, images of format A3 can seemingly be combined.

An alternative embodiment of the image combining apparatus embodying the present invention will be described hereinafter.

Referring again to FIG. 4, assume that the delay memory 30 is provided with an allocation of 297 (millimeters)×220 (millimeters)×3 to constitute frame memories of format A3 which are individually assigned to cyan, magenta and yellow, and that a color image stored in the memories are to be combined with a black-white image of a black-white document. Such a scheme is disadvantageous in that the data to be stored in the memory 30 are limited to formt A4, and in that data cannot be read out of the memory 30 unless one address generating unit is assigned to each color for registering purpose. In the light of this, a memory allocation of 297 (millimeters)×420 (millimeters)×1 is selected so that the memory 30 may serve as an A3 frame memory for any one of cyan, magenta, yellow, and black. With such a memory allocation, it is possible to combine a black-white image of a black-white document and a color image of a document of format A3. Hence, the register can be accomplished on the basis of the read start timing of the scanner 10 and, yet, data can be written in the memory 30 up to format A3. However, it is only single colors that can be combined. The alternative embodiment eliminates the above problems by allocating 297 (millimeters)×330 (millimeters) of a 297×660 (millimeters) memory as a frame memory, and 297×(millimeters)×330 (millimeters) of the same as a delay memory. The frame memory stores black data Bk so that a black-white image of a black-white document and a color image of a color document may be combined together.

FIGS. 3 and 11 each indicates a specific memory allocation particular to this embodiment. As shown, in an ordinary copy mode, 110 millimeters, 220 millimeters and 330 millimeters are allocated to the cyan memory c, magenta memory m, and yellow memory y, respectively. On the other hand, in a combine mode, the memory allocation is changed such that the black memory bm which is the frame memory occupies 330 millimeters while the magenta memory m and yellow memory y which constitute the delay memory occupy respectively 110 millimeters and 220 millimeters.

Figure 16:
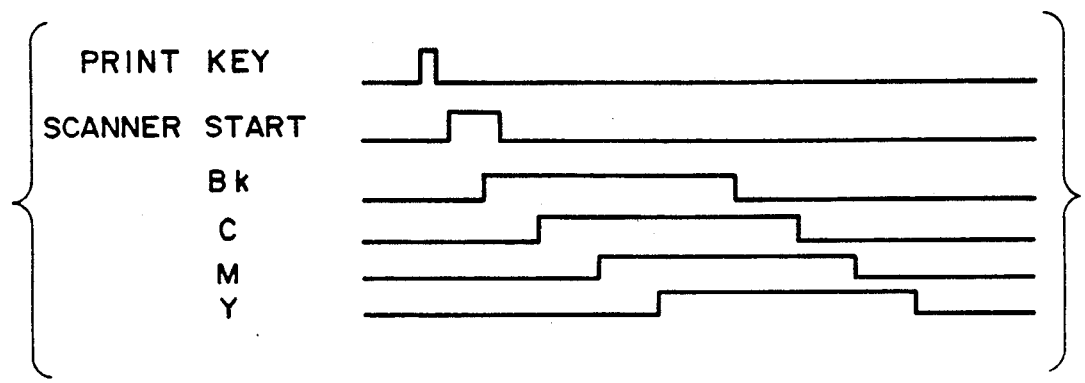
FIG. 16 is a timing chart showing the operation in an ordinary copy mode.

The operating sequence will be described with reference to the timing charts of FIGS. 16 and 17.

[1] Ordinary Copy Mode

In this mode, the memory 30 plays the role of a delay memory. As shown in FIG. 6, when the print key 606 is pressed, the scanner 10 starts scanning a document. The resulting image data are processed by the image processor 20 and then delivered to the inlet of the memory 30. The black data Bk are outputted first, then cyan C data are outputted with a delay corresponding to 110 millimeters, then magenta data M are outputted with a delay corresponding to 220 millimeters, and then yellow data Y are outputted with a delay corresponding to 330 millimeters.

[2] Combine Copy Mode

Figure 17:
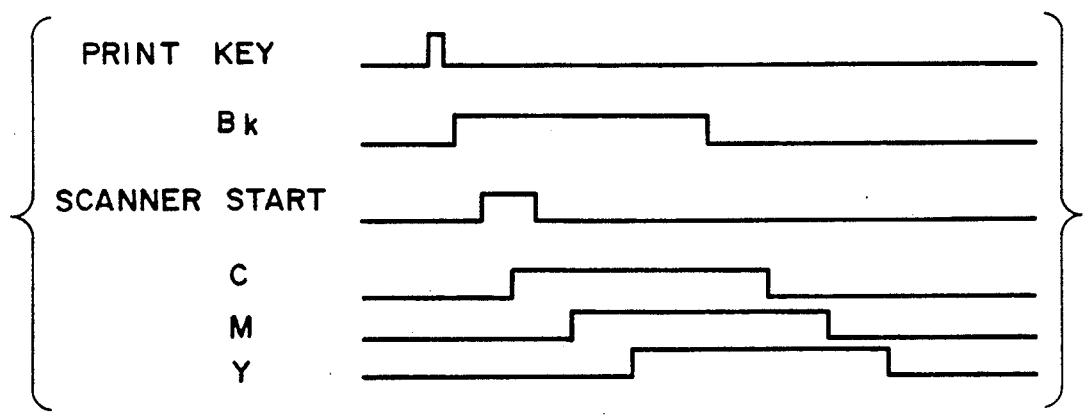
FIG. 17 is a timing chart showing the operation in a combine copy mode.

As shown in FIG. 17, when the print key 606 is pressed, the scanner 10 begins to scan a document at the same timing as in the ordinary copy mode. At this instant, only black data Bk associated with the document are written in the 330 millimeters frame memory of the memory 30. Then, as the print key is pressed again, the black data Bk begin to be outputted. The scanner 10 starts scanning the document such that cyan data C are fed to the printer 40 in synchronism with the black data Bk being read out. Thereafter, magenta data M and yellow data Y are sequentially outputted with delays corresponding to 110 millimeters and 220 millimeters, respectively.

Figure 18:
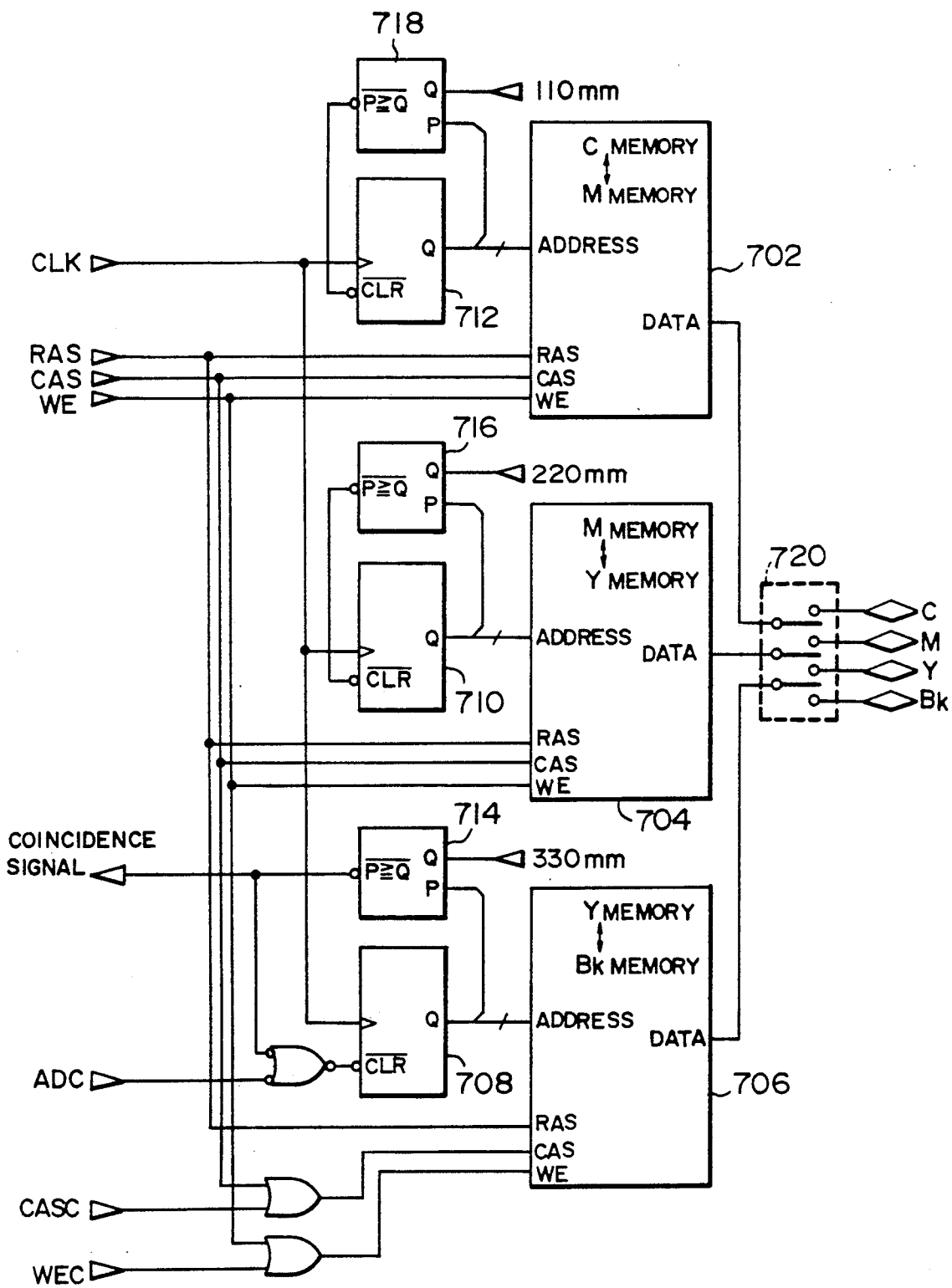
FIG. 18 is a schematic block diagram showing an alternative embodiment of the present invention.
Figure 19:
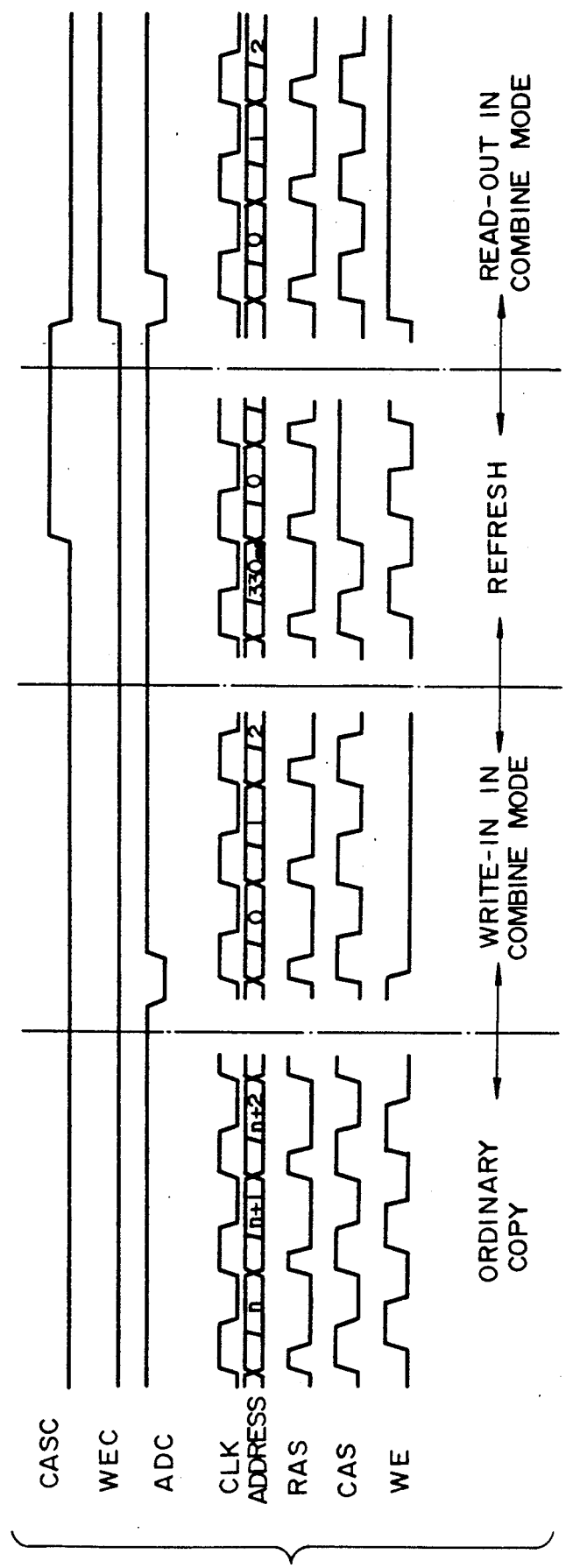
FIG. 19 is a timing chart representative of the operation of the embodiment shown in FIG. 18.

Referring to FIG. 18, a more specific construction of the illustrative embodiment is shown. In the figure, there are shown a 110 millimeters memory 702, a 220 millimeters memory 704, a 330 millimeters memory 706, counters 708, 710 and 712, comparators 714, 716 and 718, and a data selector in the form of a switch 720. Signals CLK, RAS, CAS and WE control the individual memories 702, 704 and 706 and are generated by hardware. An address control signal ADC, a CAS control signal CASC and a WE control signal WEC are generated by a CPU on a software basis in response to a coincidence output of the comparator 714. The operation of the circuitry will be described with reference to FIG. 19.

[1] Ordinary Copy Mode

All of the address control signal ADC, CAS control signal CASC and WE control signal WEC are in a low level and are fed to the memories 702, 704 and 706 together with the control signals RAS, CAS and WE. A counter which is to be cleared on coindence of the outputs of the memories 702, 704 and 706 with 110 millimeters, 220 millimeters and 330 millimeters, respectively, is set so as to use its outputs as addresses. The memories 702, 704 and 706 which are delay memories are implemented by DRAMs and adopt a read-write cycle. The data selector 720 is wired such that cyan data C, magenta data M and yellow data M are coupled to the memories 702, 704 and 706, respectively.

[2] Combine Copy Mode (1) Write-In

Before the write-in of data, the memories 702, 704 and 706 are reset by the address control signal ADC in order to match the write start addresses. At the same time, the magenta data M, yellow data Y and black data Bk are coupled to the memories 702, 704 and 706, respectively.

(2) Refresh

As the output of the comparator 714 shown in FIG. 18 is rendered active, i.e., a coincidence signal appears, the CAS control signal CASC turns from low level to high level. This sets up an RAS only refresh cycle and, thereby, holds 330 millimeters of data.

(3) Read-Out

When the print key 606 is pressed, the address control signal ADC turns from high level to low level resulting in the read address becoming 0. At the same time, the CAS control signal CASC turns from high level to low level while the WE control signal WEC turns from low level to high level, whereby a memory read cycle is set up.

As described above this alternative embodiment of the present invention achieves the following advantages:

(1) When a black-white image of a black-white document and a color image of a color document are to be combined together, a frame memory is capable of accommodating 297 millimeters × 330 millimeters of data which is greater than format A4; and (2) When color data are not two-level data but multi-level data, a frame memory greater than format A3 is achieved if the data to be treated as black data are characters or similar two-level data.

In summary, it will be seen that the present invention provides an image combining apparatus which selectively uses a memory as a delay memory and a frame memory and promotes efficient combination of a color image and a black-white image. When the memory serves as a delay memory and a frame memory at the same time, black data may be written in the frame memory to combine a black-white image represented thereby with a color image of a color document.

Various modifications will become possible for those skilled in the art after receiving the teachings of the present disclosure without departing from the scope thereof.

What is claimed is:

1. An image combining apparatus for a digital copier having a plurality of photoconductive drums each developing an image in respective one of three colors and one particular color, said apparatus comprising:

memory means having a function of a delay memory usable to register images of individual colors and a function of a frame memory;

selecting means for selecting selected data including one of color data, associated with the three colors, for forming a color image and particular color data, associated with the particular color, for forming an image in the one particular color, and for storing said selected data in said memory means;

combining means for combining, when said selecting means has selected the color data, the color image represented by said color data stored in said memory means and an image, in the one particular color, of a document scanned by said digital copier; and combining means for combining, when said selecting means has selected the particular color data, the image, in the one particular color, represented by the particular color data stored in said memory means and a color image of a document scanned by said digital copier.

2. An apparatus as claimed in claim 1, wherein the three colors are yellow, magenta, and cyan.

3. An image combining apparatus for a digital copier having a plurality of photoconductive drums each developing an image in respective one of three colors and one particular color, said apparatus comprising:

memory means having a function of a delay memory usable to register images of individual colors and a function of a frame memory, said frame memory being assigned to particular color data associated with the one particular color and said delay memory being assigned to color data associated with the three colors and being used to register color images represented by said color data of the three colors; and combining means for combining a particular color image represented by the one particular color data associated with the particular color stored in said frame memory and a color image of a document scanned by said digital copier.

4. An apparatus as claimed in claim 3, wherein the three colors are yellow, magenta, and cyan, while the particular color is black.

5. An apparatus as claimed in claim 1, wherein said frame memory of said memory means is assigned to particular color data associated with the one particular color while said delay memory is assigned to color data associated with the three colors and is used to register color images represented by said color data.

* * * * *

UNITED STATES PATENT AND TRADEMARK OFFICE
CERTIFICATE OF CORRECTION

PATENT NO. : 5,028,992

DATED : July 2, 1991

INVENTOR(S) : Hiroshi Arai

It is certified that error appears in the above-identified patent and that said Letters Patent is hereby corrected as shown below:

On the title page, under item [30]   Foreign Application Priority Data,

```
"Aug. 25, 1988 [JP]    Japan..............62-209543
 Aug. 25, 1988 [JP]    Japan..............63-209545
  May  2, 1989 [JP]    Japan.............. 1-112201" should be --Aug. 25, 1988 [JP]    Japan .............63-209543
  Aug. 25, 1988 [JP]    Japan..............63-209545
  May   2, 1989 [JP]    Japan..............1-112201--.
```

Signed and Sealed this

Fifteenth Day of October, 1991

*Attest:*

HARRY F. MANBECK, JR.

*Attesting Officer*     *Commissioner of Patents and Trademarks*